United States Patent [19]

Hanitz

[11] 4,244,447
[45] Jan. 13, 1981

[54] MOBILE POWER CRANE-EXCAVATOR WITH OPEN GEAR GREASING

[75] Inventor: John R. Hanitz, Green Bay, Wis.

[73] Assignee: Northwest Engineering Company, Green Bay, Wis.

[21] Appl. No.: 1,711

[22] Filed: Jan. 8, 1979

[51] Int. Cl.³ .................... F01M 5/00; F16N 17/04
[52] U.S. Cl. ................... 184/6.22; 184/104 R; 212/247; 239/129; 239/139
[58] Field of Search .............. 239/128, 129, 131, 133, 239/130, 134, 139; 222/146 H, 146 R; 184/104 A, 104 R, 49, 50 R, 53, 55 R, 56 R, 6.22; 212/66–69

[56] References Cited

U.S. PATENT DOCUMENTS

| | | | |
|---|---|---|---|
| 1,982,325 | 11/1934 | Shepherd | 184/104 R X |
| 2,512,361 | 6/1950 | Mercier | 184/6.22 |
| 2,602,694 | 7/1952 | Richardson | 239/129 X |
| 2,839,332 | 6/1958 | Sackett | 184/104 A |
| 2,903,189 | 9/1959 | Patton | 239/129 |
| 3,003,649 | 10/1961 | Pzybylski | 212/66 X |
| 3,152,333 | 10/1964 | Matt | 184/6.12 |
| 3,490,606 | 1/1970 | Gordon | 212/66 |
| 3,851,731 | 12/1974 | Jorgensen | 212/68 X |
| 4,190,205 | 2/1980 | Mitchell | 239/130 X |

Primary Examiner—David H. Brown
Attorney, Agent, or Firm—Andrus, Sceales, Starke & Sawall

[57] ABSTRACT

The engine of a mobile power crane-excavator is utilized as a source of heat to soften grease so that it may be applied to the open gears on the machine, even at low ambient temperatures. Heated water from the vehicle engine is caused to flow in heat transfer relationship with cold grease through a multi-conductor hose to provide a pre-heat of the grease. The heated water is caused to heat a metallic nozzle through which the pre-heated grease flows, thus creating a final heating of the grease up to the desired temperature. Air supplied through the nozzle causes the grease to be sprayed onto the gear. The remote supply tank for the grease may also be pre-heated with hot water from the vehicle engine.

8 Claims, 3 Drawing Figures

MOBILE POWER CRANE-EXCAVATOR WITH OPEN GEAR GREASING

PRIOR ART OF INTEREST

| Prior Art Of Interest | | |
|---|---|---|
| Re.13,269 | Lowry | July 11, 1911 |
| 1,607,805 | Sprado | November 23, 1926 |
| 1,982,325 | Shepherd | November 27, 1934 |
| 2,839,332 | Sackett | June 17, 1958 |
| 2,624,624 | Kirschbaum | January 6, 1953 |
| 3,152,333 | Matt | October 6, 1964 |
| 3,254,843 | Huff et al | June 7, 1966 |

BACKGROUND AND SUMMARY OF THE INVENTION

This invention relates to mobile power crane-excavators and the like. More particularly, the invention is directed to a device to enhance the ability to grease the exposed gears on such machines.

Power crane-excavators are very large material handling vehicles and their operative mechanism includes a number of working gears which are exposed to the elements. It is, of course, necessary that these gears be supplied with grease from time to time. Manual application provides one method of supplying grease to the desired area. However, for safety and other reasons, it is preferable to utilize a different type of system.

It would be possible to construct an open gear greasing system wherein grease is supplied through fittings, nozzles or the like which are permanently disposed adjacent the gears. However, such a system would present difficulties in cold weather in view of the fact that grease tends to thicken at low temperatures.

The present invention is directed to a solution of the difficulties caused by low ambient temperatures.

In accordance with one aspect of the invention, the engine of a mobile power crane-excavator is utilized as a source of heat to soften the grease so that it may be applied to the open gears on the machine, even at low ambient temperatures.

In accordance with another aspect of the invention, heated water from the vehicle engine is caused to flow in heat transfer relationship with cold grease through a multi-conductor hose to provide a pre-heat of the grease.

In accordance with a further aspect of the invention, the heated water is caused to heat a metallic nozzle through which the pre-heated grease flows, thus creating a final heating of the grease up to the desired temperature. Air supplied through the nozzle causes the grease to be sprayed onto the gear.

In a second embodiment, the remote supply tank for the grease may also be pre-heated with hot water from the vehicle engine.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENTS

Figure 1:
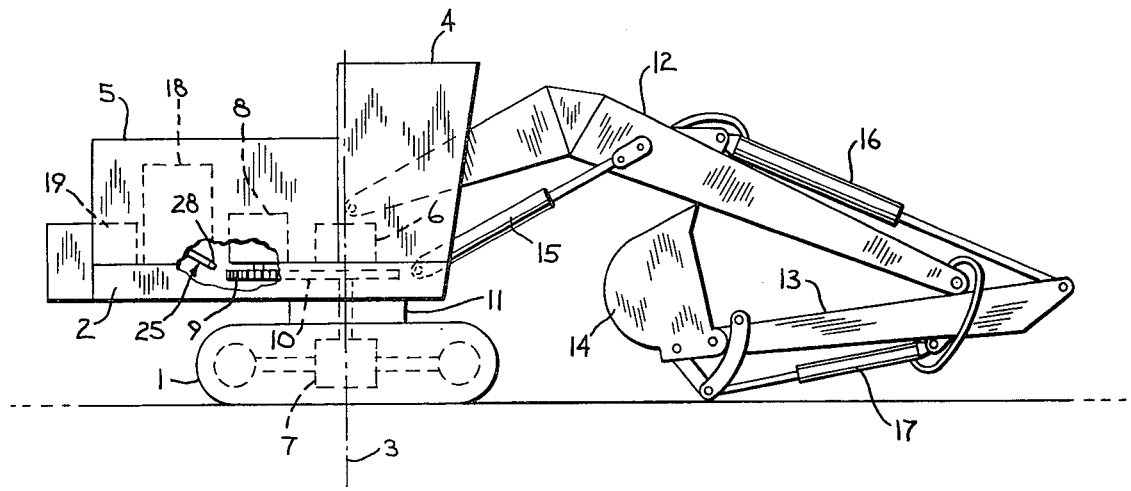
FIG. 1 is a schematic side elevation of a mobile power crane-excavator employing the inventive concept.

As shown in FIG. 1 of the drawings, the concept of the invention is adaptable for use in a material handling crane-excavator type device mounted on crawler treads 1 and which includes a platform 2 pivotable or swingable about an upright axis 3. Platform 2 supports an operator's cab 4 as well as a rear end enclosure 5 for equipment or the like.

Suitable means are provided to drive treads 1 forward and backward, and to swing platform 2 about axis 3. For this purpose, a hydraulic travel motor 6 is connected as by a suitable drive connection 7 to treads 1. Similarly, a hydraulic swing motor 8 is connected by suitable swing gears 9 and 10 to the platform suport 11 which is suitably mounted for rotation about axis 3.

Suitable framework, not shown, is also mounted on platform 2 for supporting the various operating elements. The framework supports a first load carrying member or boom 12 with a second load carrying member or dipper arm 13 pivoted thereon, and with a third load carrying member or dipper 14 pivoted to the end of arm 13. One or more boom cylinders 15, dipper arm cylinders 16 and dipper cylinders 17 are mounted to their respective elements in the usual well-known manner.

The vehicle also includes an internal combustion enginge 18 mounted within enclosure 5 and which drives a suitable hydraulic pump 19 for supplying fluid through suitable controls to operative mechanism including motors 6 and 8 as well as cylinders 15-17.

The vehicles of the type under consideration here often have at least some large drive gearing which must be greased from time to time. An example of such gearing is the swing gear 9 shown in FIG. 1. The inventive concept provides a unique system for applying grease to such a gear.

Figure 2:
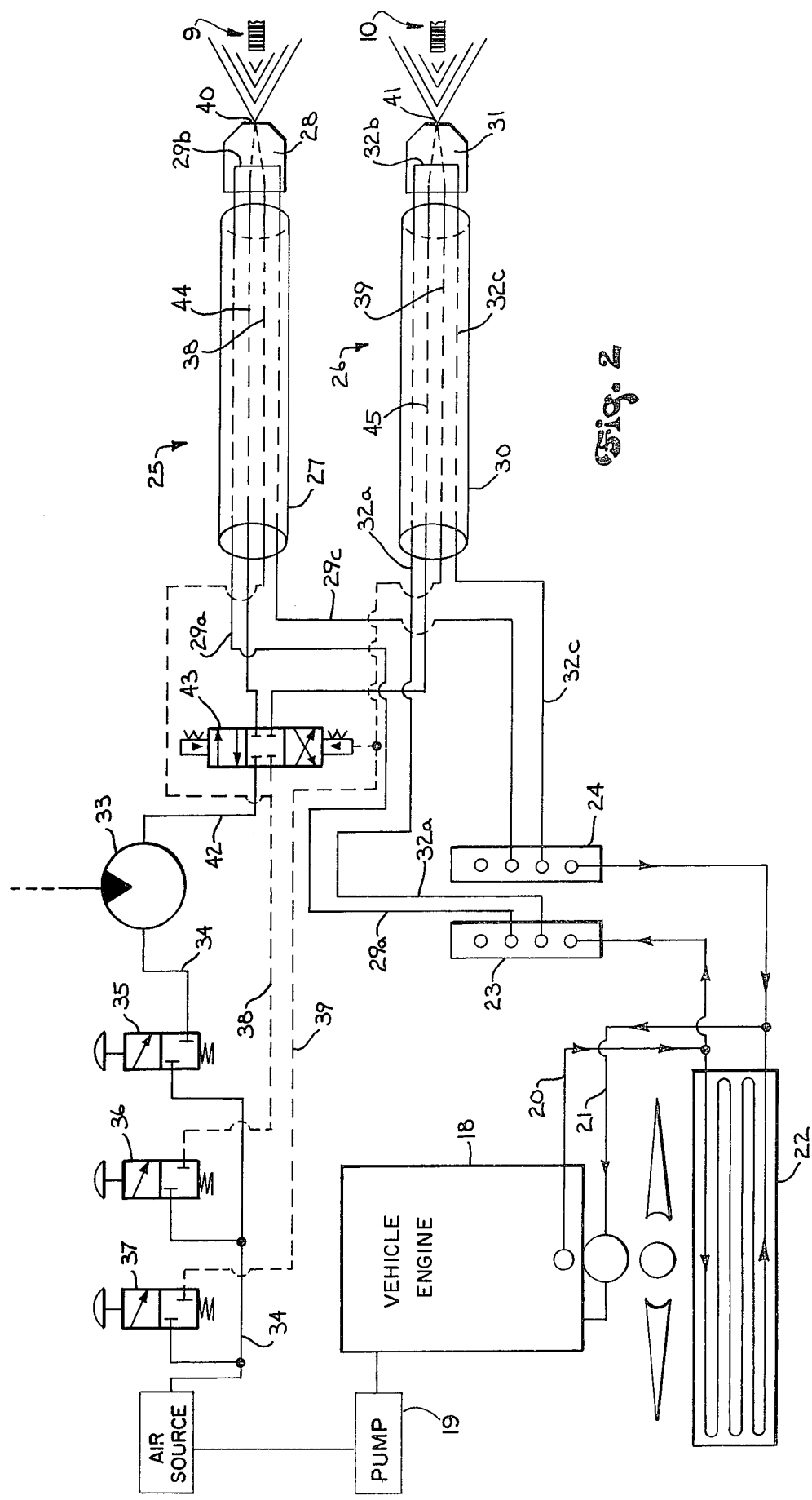
FIG. 2 is a schematic diagram of the open gear greasing system of the invention.

Referring now to FIG. 2, engine 18 is water cooled and is connected through suitable conduits 20 and 21 to the usual radiator 22. Conduits 20 and 21 are also respectively connected to a supply manifold 23 and a return manifold 24. Each manifold is adapted to service as many gear greasing spray assemblies as desired. In the present instance, FIG. 2 shows two such assemblies 25 and 26, with assembly 25 fixedly attached to the vehicle adjacent swing gear 9 (see FIG. 1), and assembly 26 attached adjacent some other gear, not shown.

Assembly 25 comprises an elongated multi-conductor hose 27 which terminates on its outer end in a nozzle block 28 of aluminum or the like. Hot water from the engine source passes through line 20 to manifold 23 and hence through a line 29a through hose 27 to nozzle block 28. At the block, a cross passage 29b connects line 29a with return line 29c which leads back to return manifold 24 and hence to the radiator 22.

The structure and circuit for nozzle assembly 26 is generally similar to that of assembly 25. Thus, assembly 26 has an elongated multi-conductor hose 30 which terminates in a nozzle block 31 of aluminum or the like. Hot water from the engine passes through line 20 to manifold 23 and hence through a line 32a through hose 30 to block 31. At the block, a cross-passage 32b connects line 32a with a return line 32c which also leads back to return manifold 24 and hence to radiator 22.

The grease which is to be heated and applied to a gear is provided from a remote source, such as a storage container or drum 33 carried on the vehicle. The upstream side of drum 33 is connected through an air line 34 to a suitable source of pressurized air, not shown, which may be connected to pump 19 in any conventional manner. A manually operable lubrication control valve 35 is disposed in air line 34 for purposes to be described. Furthermore, a pair of manually operable nozzle control valves 36 and 37 are connected on their upstream sides to air line 34, and on their downstream sides to pilot lines 38 and 39. The latter lines extend to the respective nozzle assemblies 25 and 26 and pass through the nozzle blocks to the nozzle orifices 40 and 41 for air discharge therethrough.

The air pressure in line 34, when it reaches drum 33, causes grease to be discharged from the drum through a grease supply line 42. A directional valve 43 is connected between pilot lines 38 and 39 and also to line 42. Thus, air in either line 38 or 39 causes valve 43 to permit grease to flow from line 42 through the valve and selectively through grease line 44 or 45 which respectively extend through hoses 27 or 30 and hence through nozzle orifices 40 or 41 respectively, where the grease mixes with the pressurized air and is sprayed onto a gear.

The device provides a selective control of grease spraying, either from nozzle 28 or nozzle 31. Thus, when it is desired to utilize nozzle 28 to spray grease onto swing gear 9, valves 35 and 36 are actuated simultaneously. Air in pilot line 38 causes valve 43 to shift downwardly to permit pressurized grease to flow from line 42 through the valve and hence through line 44 of gear greasing assembly 25. Air from line 38 joins with the grease at orifice 40 to create the spray. When valves 35 and 37 are simultaneously actuated, air in pilot line 39 causes valve 43 to shift in the opposite direction, i.e. upwardly, so that pressurized grease from line 42 is directed through line 45 and hence to orifice 41 for spraying.

As the pressurized grease travels through either line 44 or 45 within the respective multi-conductor hose 27 or 30, it is subjected to pre-heat due to heat transference from the closely adjacent circulating hot water lines 29a, 29c or 32a, 32c from the circulating system of engine 18. Thus, the viscosity of the grease is reduced regardless of the ambient temperature surrounding the vehicle, and even in substantially below 0° F. weather.

It has been found that the use of a nozzle 28 or 31 of aluminum or the like and through which the hot water also circulates to finally further heat the grease before it is ejected is desirable in that the grease may be lowered to the desired viscosity for spraying in a very short time. Tests have shown that with a 150° F. thermostat in the engine cooling system, multi-conductors of about 20 ft. in length and aluminum nozzles, the nozzles may be brought from 0° F. to 148° F. in about 2½ minutes with the continuously circulating engine water.

Figure 3:
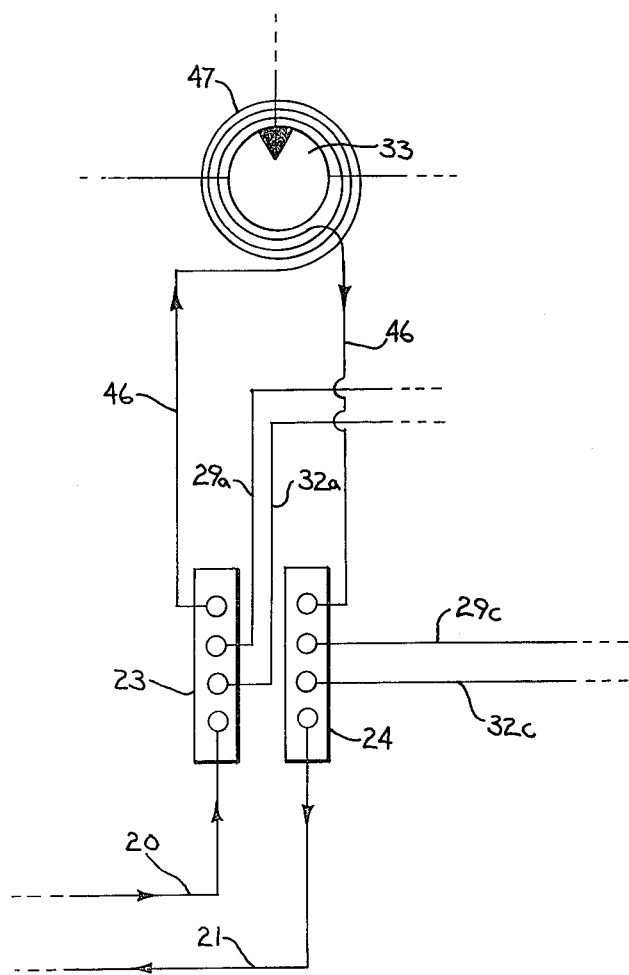
FIG. 3 is a schematic diagram of a second embodiment of the system.

In some intances, it may be desired to add a second or supplemental pre-heat to the grease upstream of assemblies 25 and 26, as for example in extremely cold weather. In such instance, and as shown in the embodiment of FIG. 3, hot water manifolds 23 and 24 may be connected by a line 46 which forms a coil 47 in its mid-portion, with the coil forming a wrap-around heater on the external surface of drum 33. The source of grease within drum 33 is thus also heated by the vehicle engine due to heat transfer from the water in coil 47.

Although the grease which is selectively sprayed from the respective nozzle will be thin and easily directed toward the desired gear, the grease will again thicken when it contacts the cold gear. Nevertheless, the results are far superior to applying grease when it is in a thickened condition.

Various modes of carrying out the invention are contemplated as being within the scope of the following claims particularly pointing out and distinctly claiming the subject matter which is regarded as the invention.

I claim:

1. In a mobile power crane-excavator having operative mechanism including exposed gears:
   (a) a frame,
   (b) a water cooled internal combustion engine mounted on said frame and with said engine providing a source of heated water,
   (c) means connecting said engone to said operative mechanism for driving the latter,
   (d) a source of grease for application to said gears,
   (e) a gear greasing spray assembly disposed adjacent a said gear,
   (f) and means for transporting both grease from said source and heated water from said engine into closely adjacent heat transferring relationship at said spray assembly so that the traveling grease is lowered in viscosity before being sprayed onto the said gear.

2. The mobile power crane-excavator of claim 1 wherein said gear greasing spray assembly comprises means to provide a pre-heat and a subsequent final heating of said traveling grease.

3. The mobile power crane-excavator of claim 2 which includes:
   (a) a multi-conductor hose through which the grease and heated water pass to create the said pre-heat,
   (b) and an aluminum spray nozzle disposed on the outer end of said hose and through which the grease and heated water pass to create the said subsequent final heating.

4. The mobile power crane-excavator of claim 1 or 3 which includes:
   (a) a source of pressurized air connected to said engine,
   (b) and means to supply said air to said spray assembly for application of grease to the said gear.

5. The mobile power crane-excavator of claim 4 wherein said grease source is connected between said air source and said spray assembly so that said pressurized air causes grease to travel from said grease source to said assembly.

6. The mobile power crane-excavator of claim 4 which includes:
   (a) a plurality of gear greasing spray assemblies with each assembly disposed adjacent a said gear,
   (b) first valve means connected between said grease source and said spray assemblies,
   (c) second valve means connected between said air source and said first valve means,
   (d) and means for selectively actuating said second valve means to thereby actuate said first valve means to supply grease to a selected spray assembly through said first valve means.

7. The mobile power crane-excavator of claim 4 which includes means disposed upstream of said gear greasing spray assembly to provide an initial pre-heat of the grease supplementing said first pre-heating means.

8. The mobile power crane-excavator of claim 6 wherein:
   (a) said grease source comprises a grease container,
   (b) and said initial pre-heat means comprises a hot water conduit disposed in heat transferring relationship with said container and with said conduit being connected to said engine.

* * * * *

UNITED STATES PATENT AND TRADEMARK OFFICE
CERTIFICATE OF CORRECTION

PATENT NO. : 4,244,447
DATED : January 13, 1981
INVENTOR(S) : JOHN R. HANITZ

It is certified that error appears in the above-identified patent and that said Letters Patent are hereby corrected as shown below:

Column 2, Line 57, After "passage" insert ----29b----;
Column 2, Line 58, After "leads" insert ----back to----;
Column 4, Line 13, Delete "engone" and substitute therefor ----engine----; Column 4, Line 61, Delete the numeral "6" and substitute therefor ----7----.

Signed and Sealed this

Fourteenth Day of July 1981

[SEAL]

Attest:

GERALD J. MOSSINGHOFF

Attesting Officer

Commissioner of Patents and Trademarks